United States Patent

[11] 3,612,494

[72] Inventors Akira Toyama
 Kobe-shi;
 Yukio Nakako, Nishinomiya-shi; Toshio
 Kanazawa, Kobe-shi, all of Japan
[21] Appl. No. 856,622
[22] Filed Sept. 10, 1969
[45] Patented Oct. 12, 1971
[73] Assignee Kobe Steel, Ltd.
[32] Priority Sept. 11, 1968, Sept. 20, 1968, Sept. 22, 1968
[33] Japan
[31] 43/65339, 43/68056 and 43/70051

[54] GAS-LIQUID CONTACT APPARATUS
 12 Claims, 19 Drawing Figs.
[52] U.S. Cl. .................................................... 261/112,
 261/97
[51] Int. Cl. ....................................................... B01f 3/04
[50] Field of Search .......................................... 261/112,
 113, 97

[56] References Cited
 UNITED STATES PATENTS
 2,783,982 3/1957 Kahl ............................ 261/112 X
 3,084,918 4/1963 Kohl et al. .................... 261/112
 3,259,380 7/1966 Brown .......................... 261/97
 3,281,133 10/1966 Eckert .......................... 261/97
 3,282,334 11/1966 Stahlheber .................... 261/112
 3,316,064 4/1967 Kuzuoka et al. .............. 261/112 X
 3,466,151 9/1969 Sicard et al. .................. 261/112 X Primary Examiner—Tim R. Miles
Attorneys—Harry C. Bierman, Jordan B. Bierman and Bierman & Bierman ABSTRACT: In a gas-liquid contact apparatus comprising a gas-liquid contact part accommodating metal fin material, a liquid distributor provided on the gas-liquid contact part, a gas distributor provided at an appropriate position on the gas-liquid contact part, a liquid inlet provided in connection with the liquid distributor, a liquid outlet provided at the lowest position of the apparatus, a gas inlet provided in connection with the gas distributor and a gas outlet provided at the highest position of the apparatus, an improvement wherein the fin material consists of one or more corrugated metal fins mounting to each other and at least one gas-liquid redistributor for forming a gas passage on the side of a liquid distribution conduit and in which are provided at the bottom at a position lower than the liquid distributor and higher than the gas distributor.

YUKIO NAKAKO
TOSHIO KANAZAWA
AKIRA TOYAMA
INVENTORS

BY
Berman & Berman
ATTORNEYS

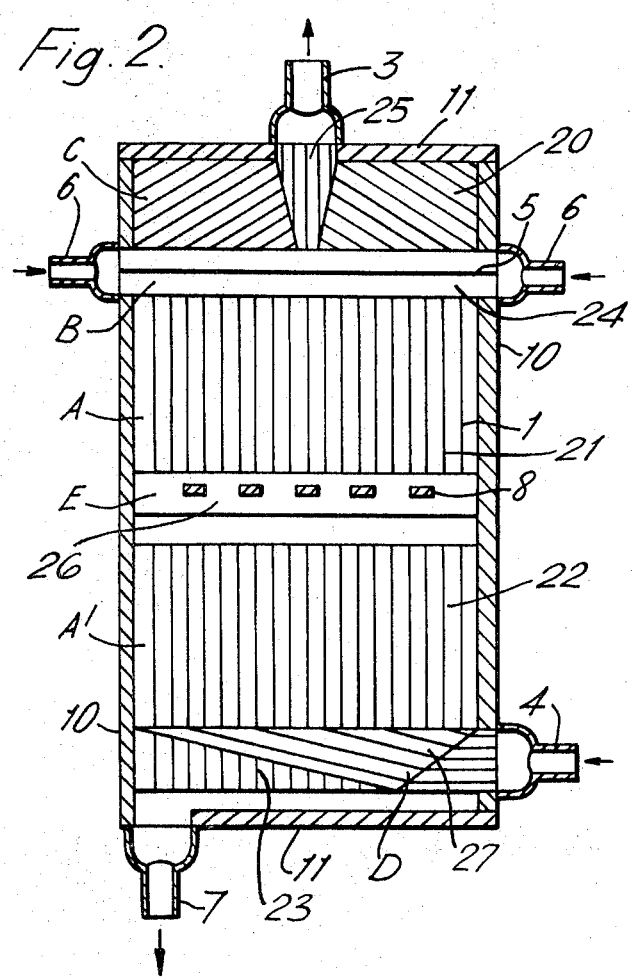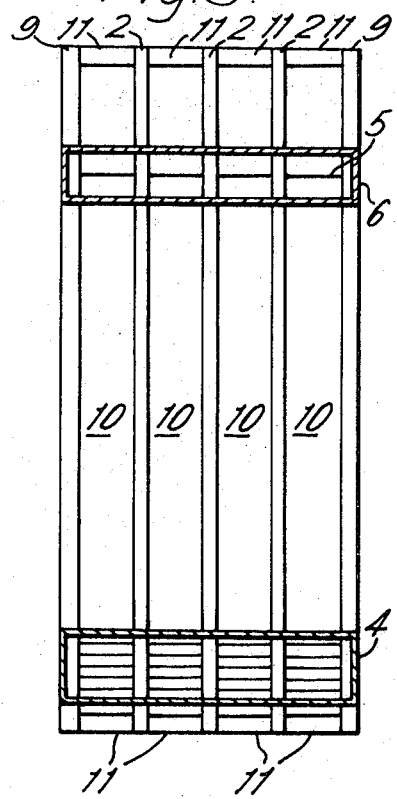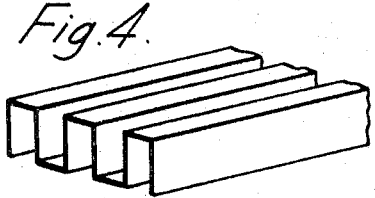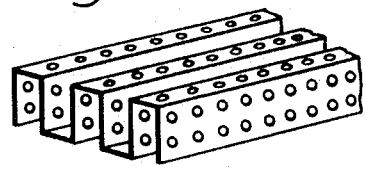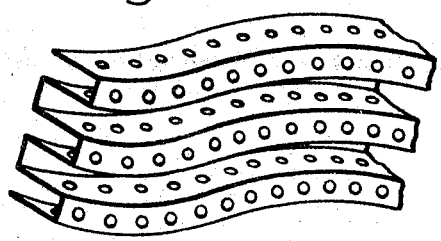

YUKIO NAKAKO
TOSHIO KANAZAWA
AKIRA TOYAMA
INVENTORS

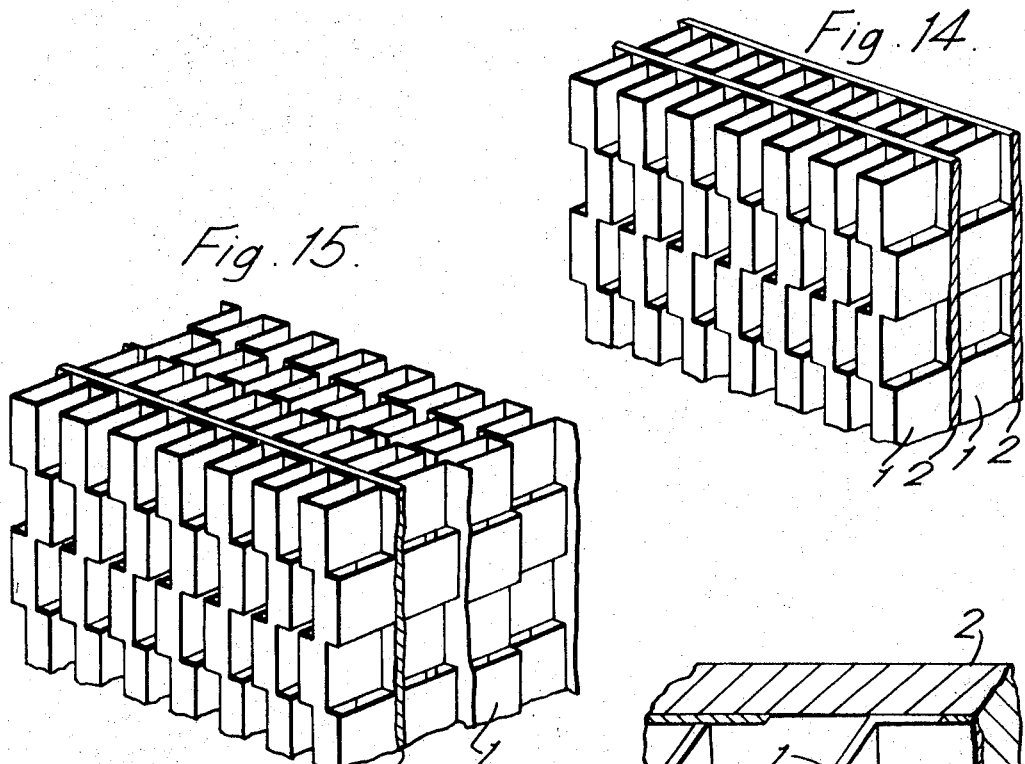
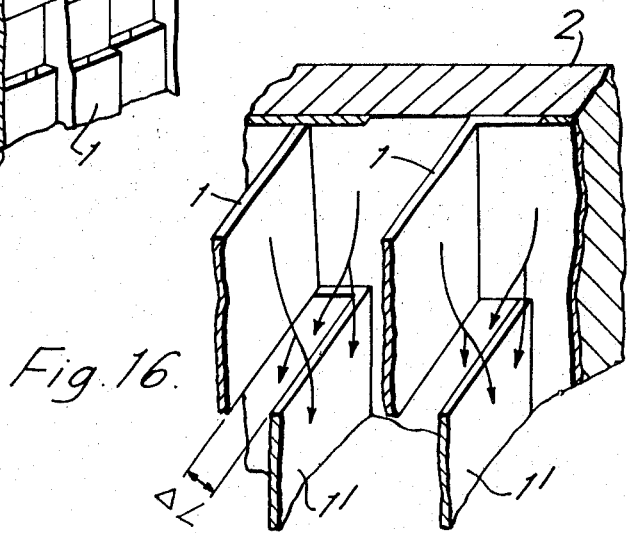
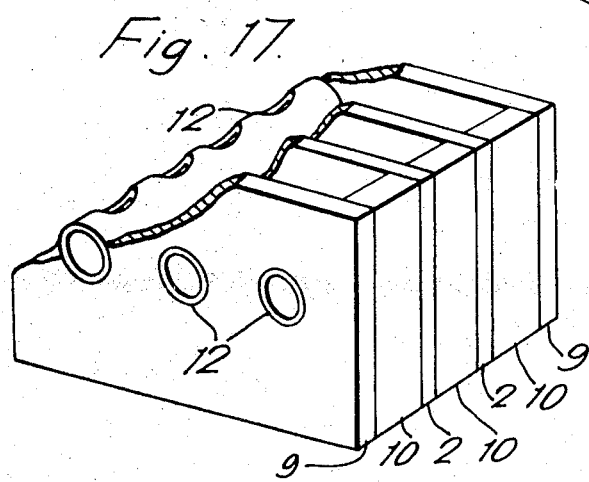
YUKIO NAKAKO
TOSHIO KANAZAWA
AKIRA TOYAMA
INVENTORS

YUKIO NAKAKO
TOSHIO KANAZAWA
AKIRA TOYAMA
INVENTORS

GAS-LIQUID CONTACT APPARATUS

The present invention relates to a gas-liquid contact apparatus of stacked packed column type. More particularly, it relates to a gas-liquid countercurrent contact apparatus comprising a part, wherein contact between a gas and a liquid can occur, said part having regularly arranged packing of large specific surface area and a liquid distributor brazed integrally with the said gas-liquid contact part.

In comparison with a gas-liquid contact apparatus of tray column type, a packed column type apparatus has some advantages such as simplicity in structure, easiness in selection of construction materials, low pressure drop in operation and broadness in the range of gas-liquid ratio but also some drawbacks such as difficulty in the uniform distribution of liquid to packings, difference of liquid distribution in the column and depression of rectification ability due to the biased flows of gas and liquid. Further, a stacked packed column type apparatus has a much greater treatment capacity but is more difficult in packing regularly into the column, compared with a dumped packed column type apparatus. The said drawbacks present in known stacked packed column type apparatus are now overcome by the present invention.

Thus, the present invention is concerned with an improvement in a gas-liquid contact apparatus comprising a gas-liquid contact part accommodating metal fin material, a liquid distributor provided on the gas-liquid contact part, a gas distributor provided at an appropriate position of the gas-liquid contact part, a liquid inlet provided in connection with the liquid distributor, a liquid outlet provided at the lowest position of the apparatus, a gas inlet provided in connection with the gas distributor and a gas outlet provided at the highest position of the apparatus, the improvement being in that the fin material consists of one or more corrugated or wave-type metal fins brazed each other intervening or not a spacer plate between them and at least one gas-liquid redistributor constructed by brazing metal fin material forming a gas passage on the side of a liquid distribution conduit having holes at the bottom is provided at the position lower than the liquid distributor and higher than the gas distributor.

As the construction material for the gas-liquid contact apparatus, there is preferably used aluminum alloy, iron alloy, copper alloy or the like.

The gas-liquid contact part it so constructed that fins are brazed in laminar structure, each fin being made by folding a thin plate regularly with small pitches so as to increase the contact area of gas and liquid and the capacity of treatment, i.e. to increase the specific surface area. Although the fin itself is thin, brazing serves to maintain the structural strength. The use of regularly folded fins at the gas-liquid contact part makes equal the void fraction at the column section and eliminates difference of liquid distribution in the column and depression of rectification ability caused by the biased flows of gas and liquid. The insertion of a flat perforated or unperforated plate as a spacer between the fins serves to suppress the biased flows of gas and liquid and lessen the unfavorable influence caused thereby.

The gas distributor, the liquid distributor and the gas-liquid redistributor may be each composed of a liquid distribution conduit having holes at the bottom and fins brazed to the side of the said conduit, the fins providing a pass way for gas. In the liquid distribution conduit, the depth of liquid is kept enough so that the liquid evenly flows out from all the holes of the conduit and the influence of the head-loss by the flow of liquid in the conduit is made small. In alternative, gas and liquid may be uniformly distributed by the application of a distributor in which perforated fins having alternatively holes of greater and smaller diameters are arranged perpendicularly to the direction of the flow. Further, liquid may be uniformly distributed by the application of a distributor in which pipes having many holes are arranged perpendicularly to flat plates and inserted between fins. Furthermore, the uniform distribution of liquid may be accomplished by the application of a distributor in which fins provided with holes are arranged perpendicularly to the direction of flow and liquid feed pipes having many holes are provided thereon.

The gas-liquid contact apparatus of this invention may be used in the same field as conventional gas-liquid contact apparatus are employed. It is particularly suited for the contact of gas and liquid having low surface tension and viscosity, when thin and wave type fins made of aluminum alloy with small pitches are employed. More particularly, it is suitable for rectification of liquid air, hydrocarbons and so on.

The apparatus of the invention will be hereinafter explained in detail with reference to the attached drawings.

FIG. 2 is the sectional view of the apparatus taken on the line II—II of FIG. 1;

FIG. 3 is a side view in partial detail of the apparatus of FIG. 1;

FIG. 4–8 are detailed isometric views of various types of corrugated fins for use in the apparatus of this invention;

FIG. 14 is an isometric detail view showing one manner in which the gas—liquid contact fins of the invention may be assembled;

FIG. 15 is an isometric detail view showing another manner in which the gas-liquid contact fins of this invention may be assembled;

FIG. 16 is a detailed isometric view of a section of fin used for gas-liquid contact and showing how the liquid is distributed among the fins;

FIG. 17 is a detailed isometric view of another embodiment of a gas-liquid distributor;

This apparatus is composed of fin type gas-liquid contact part A, A' which control the absorption of gas, a liquid distributor B which distributes uniformly liquid to the gas-liquid contact part A, a gas gathering part C from which gas flows up uniformly to a gas outlet 3, a gas distributor D in which the feed gas provided from a gas inlet 4 is distributed uniformly to the gas-liquid contact part A' and the liquid flowed down from the gas-liquid contact part A is guided to a liquid outlet 7, and a redistributor E. The feed gas provided from the gas inlet 4 flows up in the gas-liquid contact part A' while contacting uniformly with the down-flow liquid. The absorbable component in the gas is absorbed in a high efficiency into the liquid flowing down on the surfaces of fins, and the resultant gas is sent outside from the gas outlet 3 through the gas gathering part C. On the other hand, the absorbing liquid provided from a liquid inlet 6 is distributed uniformly at the liquid distributor B and flows down into the gas-liquid contact part A uniformly. By contact of the down-flow absorbing liquid with the up-flow gas containing an absorbable component on the surfaces of fins, the liquid absorbs the component and flows down to the liquid outlet 7 while contacting at the gas distributor D with the feed gas provided from the gas inlet 4 and goes outside. When the recovery of the absorbed component or the absorbing liquid is required, the liquid from the liquid outlet 7 is subjected to the subsequent separation process. When the recovery is unnecessary, the liquid is discharged as waste liquor.

Figure 7:
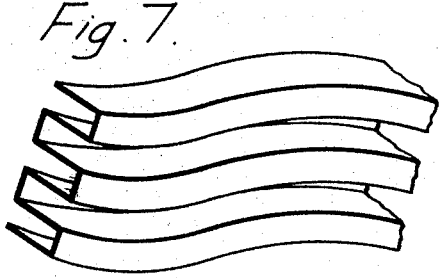
Figure 8:
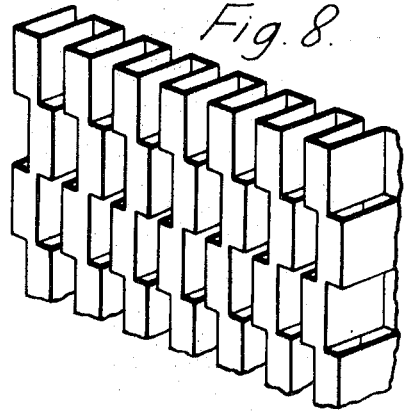

As shown in FIG. 2, the apparatus has four contact fin sections represented by numerals 20, 21, 22, 23 and four redistributors represented by numerals 24, 25, 26, 27. Although four contact fin sections and four redistributors are shown, it is to be understood that more or less contact fins and redistributors can be used depending on desired capacity or the type of construction employed. The gas-liquid contact parts A, A', the liquid distributor B, the gas gathering part C, the gas distributor D and the redistributor E are constructed by arranging fins suited for each part. For the gas-liquid contact parts A, A', there are used fins prepared by folding regularly thin metal plates. Examples of the fins are wave type ones as shown in FIGS. 4 to 8, these figures showing illustratively the partial perspective views of the fins. Among these various fins, the one shown in FIG. 4 is the lowest in preparation cost and the most excellent in mechanical strength. But, it is not suited when the treating liquid contains impurities or crystals are formed, because the passways are blocked and the treatment is prevented. On the contrary, the perforated fin and the serrate fin, as shown in FIGS. 5 and 8, make possible to flow gas and liquid in the horizontal direction of fin and can be favorably applied even when the treating liquid contains impurities or crystals are formed. Besides, the perforated or serrate fin accelerates the mass transfer by liquid shortage or liquid accumulation and improves the rectification effect in a certain range of flow-pass, for example, in the stable region below the loading point. Comparing the perforated fin with the serrate fin, the former is suited for use under a medium or low pressure and the latter is suitable for use under a high pressure. The perforated and unperforated ruffle fins as shown in FIGS. 6 and 7 are especially suited for the case of low liquid load, e.g. gas-liquid contact in vacuum. The perforated ruffle fin may be used even when the treating liquid contains impurities and the flow-pass is blocked with formed crystals. By choosing appropriately the thickness and pitch of each wave fin, the highest rectification efficiency and the maximum treatment capacity are gained.

In the gas gathering part C, there are arranged perforated fins as shown in FIG. 5 in such a manner that the gas flowing up from the gas-liquid contact part A uniformly flows into the gas outlet 3. In the gas distributor D, there are arranged perforated fins in such a manner that the feed gas is uniformly distributed in the gas-liquid contact part A' and the down-flow liquid flows down to the liquid outlet 7.

Figure 9:
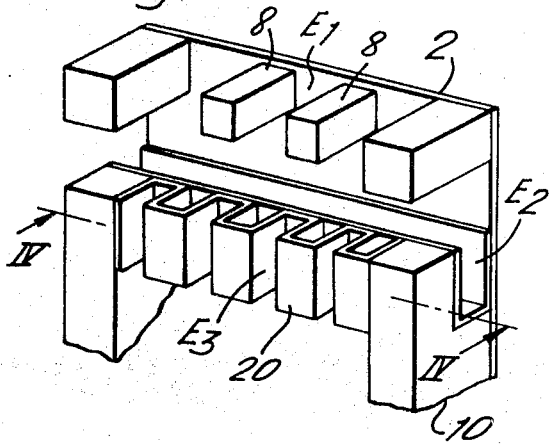
FIG. 9 is a detailed isometric view of the redistributor of FIG. 2.

The redistributor E is, as shown in FIG. 9 illustratively showing the partial perspective view of the redistributor, composed of a gas passway $E_3$ constructed by a straight fin 20, a liquid distribution conduit $E_2$ having holes at the bottom and a gas distribution passway $E_1$ located above the passway $E_3$ and the said liquid distribution conduit $E_2$ and provided with supporting rod 8 for reinforcement.

Figure 10:
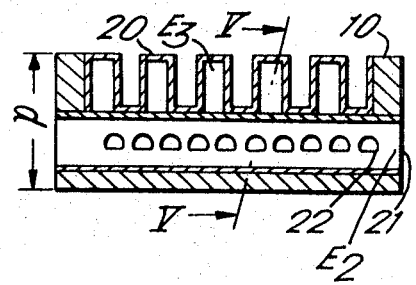
FIG. 10 is a detail view of the redistributor of FIG. 9 taken along line IV—IV of FIG. 9.
Figure 11:
FIG. 11 is a detail view of another embodiment of the redistributor of FIG. 9 taken along the line V—V in FIG. 10.
Figure 12:
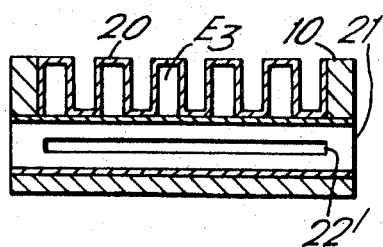
FIG. 12 is a detail sectional view of another embodiment of a redistributor similar to that of FIG. 9.

The liquid from the upper gas-liquid contact part A flows down uniformly to the lower gas-liquid contact part A' through the holes at the bottom of the liquid distribution conduit $E_2$. This distribution conduit is, as shown in FIG. 10 (the IV—IV sectional view of FIG. 9) and FIG. 11 (the V—V sectional view of FIG. 10), provided with many holes 22 at the bottom 21 where the bottom hole plate 23 is bent down so that the liquid flows down to the direction of the center of the gas-liquid contact part A' and is distributed uniformly on the surfaces of fins. When the width d of the gas-liquid contact element is narrow, the liquid can be quite uniformly distributed without the bent down plate 23. In the embodiment shown in FIG. 10, the holes are formed as a single line of many holes. Such holes may be replaced by a slit 22' as shown in FIG. 12 or, depending on the width d of the gas-liquid contact element, may be formed in plural lines of holes or slits.

The up-flow gas flows from the lower gas-liquid contact part A' into the gas distributor $E_1$ through the gas passway $E_3$ and then into the upper gas-liquid contact part A. As the flow area of the up-flow gas passway $E_3$ is here about one-half that of the gas-liquid contact part A or A', the linear velocity of the up-flow gas at the passway $E_3$ becomes about twice that at the gas-liquid contact part A or A'. Therefore, the liquid flowed down from the upper gas-liquid contact part A reaches almost the flooding state with the up-flow gas and the down-flow liquid being transfered to the liquid distribution conduit $E_2$ by the vigorous mixing action of gas and liquid. Thus, the redistributor E serves not only for separation and distribution of the down-flow liquid from the upper gas-liquid contact part A and the up-flow gas from the lower gas liquid contact part A' but also for contact of gas and liquid in a high efficiency by utilization of the flooding phenomenon.

Figure 13:
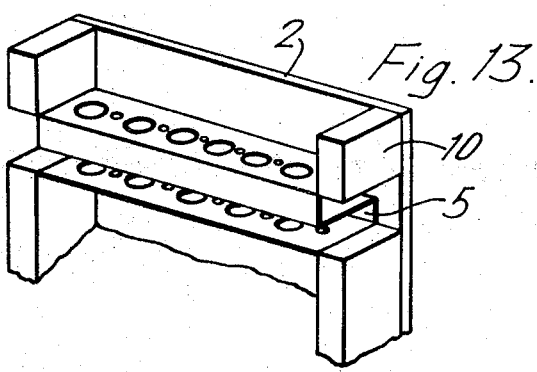
FIG. 13 is a detailed isometric view of a liquid distributor in accordance with this invention.

The liquid distributor B is provided with perforated fins 5 (shown in FIG. 13) having alternatively two kinds of holes of different diameters and has a gas-liquid distribution ability. The up-flow gas increases its linear velocity and reaches to the flooding point to cause vigorous contact of gas and liquid when it passes the distributing part, i.e., the multihole part. As the distributor has two kinds of holes having different diameters, the up-flow gas passes through the holes of larger diameter and down-flow liquid does through those of small diameter. Thus, the liquid distributor B serves not only for separation and distribution of the liquid from the liquid inlet 6 and the up-flow gas from the gas-liquid contact part A but also for contact of the gas and the liquid in a high efficiency. For the liquid distributor B, the same structure as the liquid redistributor may be applied.

Figure 1:
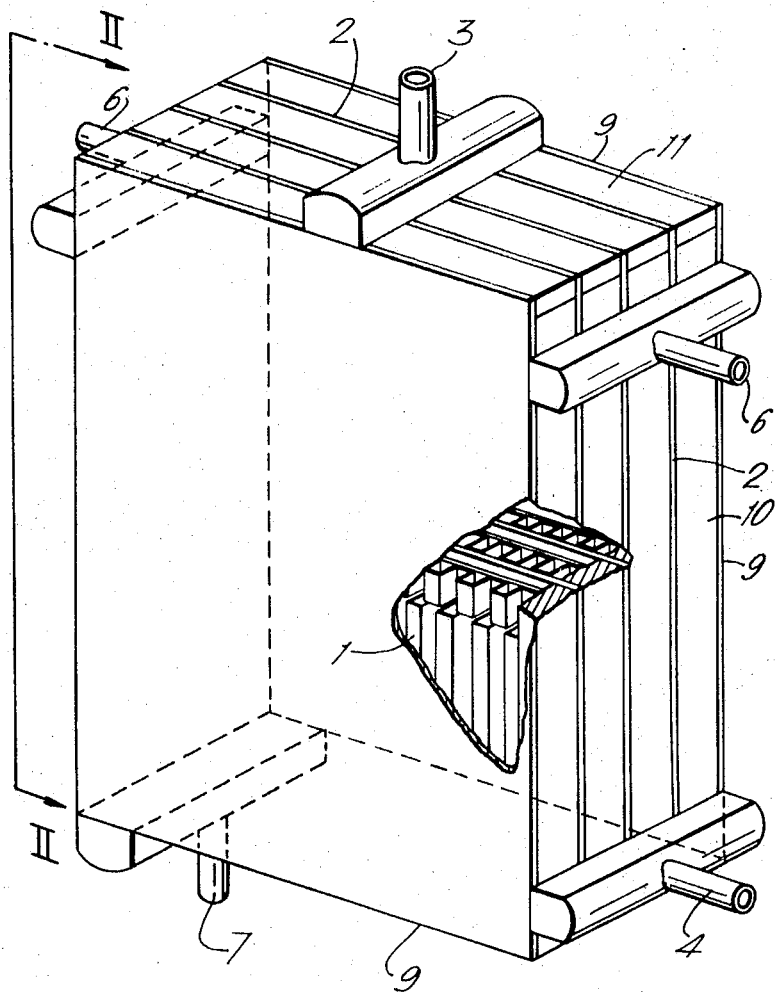
FIG. 1 is a perspective view with a partial cutoff showing the outline of the external structure of a gas-liquid contact apparatus embodying the invention when applied for a gas absorber.

The above mentioned parts are, as shown in FIG. 2 and FIG. 3 which is a side view of FIG. 1 without the gas inlet 4 and the liquid inlet 6, surrounded by two outer plates 9, two side plates 10 and two upper and lower surface plates 11, all these being braized integrally in a conventional manner.

For constructing the apparatus, the fins 1 for the gas-liquid contact parts A, A', the fin 5 for the liquid distributor B and other fins for the gas gathering part C, the gas distributor D and the redistributor E are arranged appropriately in contact with the outer side plate 9 and surrounded by the side plates 10 and the upper and lower surface plates 11. Then, the plate 2 is piled on, and the second layer of the fins is arranged. After piling a desired number of the layers in the same manner, these are braized integrally by a conventional manner.

In the gas-liquid contact parts A, A', there are arranged fins and flat plates 2 alternatively in laminar structure as shown in FIG. 14 or only fins in multilaminar structure as shown in FIG. 15. Thus, the insertion of the flat plates is optional.

In this invention, the fins are preferably constructed in laminar structure. When the neighboring fins form vacancies connecting each other as shown in FIG. 8 for the serrate fin or in FIGS. 5 and 6 for the perforated fins, the down-flow liquid and the up-flow gas are mixed and distributed through the connected vacancies and the gas and the liquid are distributed to the lateral direction uniformly without any concentration change. Especially when the serrate fin as shown in FIGS. 14 or 15 is used for the gas-liquid contact part, the effective liquid shortage and liquid accumulation are observed. As shown in FIG. 16, the liquid (an arrow sign) flowed down on the surface of the serrate fin 1 stays temporarily at the upper edge part of the lower fin 1', i.e. the pitch slip $\Delta L$ between the fin 1 and the fin 1', is mixed and flows down on the surface of the extremely thin fin 1' with separation into two flows. As the liquid flowed down on the surface of the upper fin is thus mixed and separated at the upper edge part of the lower fin and again mixed and separated at the lower part, the liquid distribution in the lateral direction and the composition of the liquid are made uniform providing the most preferable state. Here, the pitch-slip $\Delta L$ may be decided appropriately taking the viscosity and surface tension of the liquid into consideration.

The spacer plates to be inserted between the fins, as shown in FIGS. 14 or 15, are preferred to be the ones having many holes so that the gas-liquid contact vacancies between the spacer plates are connected to make uniform the distribution of gas and liquid in the apparatus and enhance the gas absorption efficiency.

FIG. 17 shows another embodiment of the gas-liquid distributor to be applied for the gas-liquid contact apparatus of this invention, which is constructed by brazing metal pipes 12 having many holes at the upper and lower surfaces piercingly in and perpendicularly to the spacer plates 2. Such pipes 12 serve for distributing effectively gas and liquid and also as the supports for the spacer plates 2.

Figure 18:
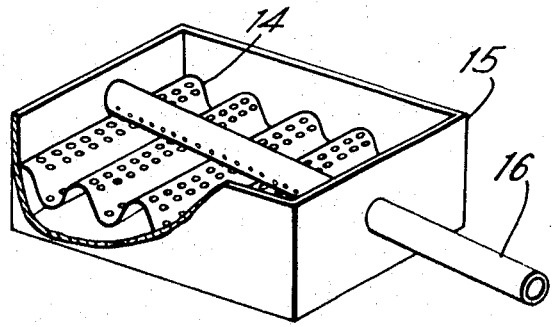
FIG. 18 is a detailed isometric view of still another embodiment of a gas-liquid distributor.

FIG. 18 shows a still further embodiment of the gas-liquid distributor to be applied for the gas-liquid contact apparatus of the invention, in which a wave-type fin 14 is welded with a frame 15 and liquid is distributed by a nozzle 16. The wave-type fin 14 has many holes of which the diameter may be determined on the basis of the desired linear velocity. Gas flows up through the holes of the summit of the wave type fin 14 and the liquid stays in the drain. When the liquid comes to a suitable level, it flows down and is distributed uniformly through the holes. This distributor is welded integrally with the unit of the fin-type gas-liquid contact part A.

Figure 19:
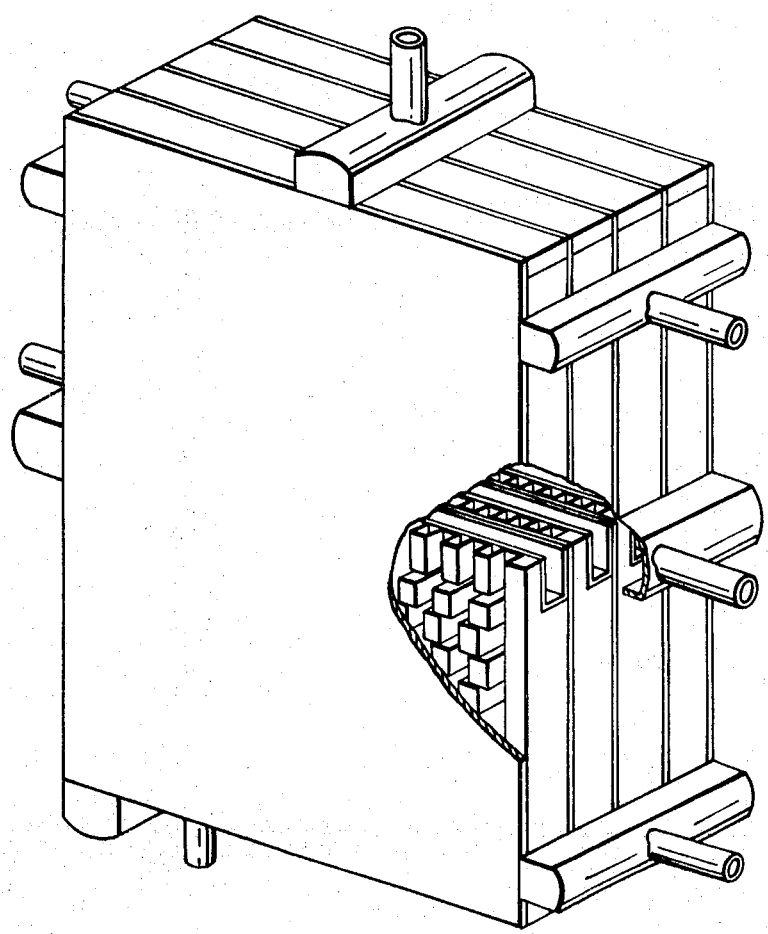
FIG. 19 is an isometric plan view of a gas-liquid contact apparatus adapted for use as a rectifier.

When the gas-liquid contact apparatus of the invention is used for the rectification purpose, the redistributor E shown in FIG. 1 is provided with a nozzle for feeding liquid as shown in FIG. 19.

In the gas-liquid contact apparatus of this invention, the down-flow liquid of the gas-liquid contact part flows down on the surfaces of the fins with extending uniformly and in a wet-wall state. Thus, the contact area of gas and liquid is almost equal to the surface area of the fins and, as shown in table 1, several times larger in comparison with that on conventional packings.

Table 1.

| Type | Comparison of Specific Surface Area Fins | | | |
|---|---|---|---|---|
| | Height (mm.) | Thickness (mm.) | Pitch (mm.) | Specific surface area (m.²/m.³) |
| Serrate fin | 9.5 | 0.2 | 1.7 | 1,270 |
| | 4.7 | 0.3 | 2.0 | 1,210 |
| Straight fin | 9.5 | 0.2 | 1.7 | 1,270 |
| | 4.7 | 0.3 | 2.0 | 1,210 |
| Perforated fin | 4.7 | 0.3 | 2.0 | 930 |
| | 3.2 | 0.3 | 3.5 | 800 |

Other Packings

| Type | Size (inch) | Thickness (inch) | Specific surface area (m.²/m.³) |
|---|---|---|---|
| Porcelain Raschig ring | 3/8 | 1/16 | 440 |
| | 1/2 | 3/32 | 400 |
| | 1 | 1/8 | 190 |
| Steel Lessig ring | 3/8 | 1/32 | 712 |
| | 1/2 | 1/32 | 546 |
| | 1 | 1/16 | 268 |
| Saddle packing | 1/2 | | 466 |
| | 3/4 | | 269 |

Moreover, the contact of gas with liquid in the apparatus of this invention is much more efficient than that in a conventional apparatus, for instance, as shown in the following example.

In the fin type gas-liquid contact part of 9.5 mm. long, 100 mm. wide and 100 mm. high, a serrate fin which has a height of 9.5 mm. a pitch of 1.7 mm. and a thickness of 0.2 mm. or a serrate fin which has a height of 9.5 mm., a pitch of 1.4 mm. and a thickness of 0.2 mm. is applied, and the efficiency of the gas-liquid contact is determined. The results are shown in table 2, compared with a conventional column packed with Raschig rings.

TABLE 2

| | Packing | | |
|---|---|---|---|
| | Serrate fin | | Raschig ring, 0.5φ× 10×1.5t |
| Rectification ability | Pitch 1.7 mm. | Pitch 1.4 mm. | |
| Operation permissible vapor velocity, m./s. | ≧1.4 | ≧0.6 | ≦0.9 |
| Height per transfer unit, m. | 0.05-0.06 | 0.03-0.04 | 0.20 |
| Pressure drop ratio | 1 | | 1 |

It is clear from table 1 that the gas-liquid contact apparatus using fins of this invention is much greater in the gas and liquid contact area than a conventional column packed with Raschig rings.

In the conventional column, the distribution of liquid becomes uneven due to difference in void fraction and the capacity is decreased by the shortage or accumulation of liquid. In the gas-liquid contact apparatus of the invention, the packing density of fins is uniform and the void fraction is even so that the distribution of liquid is uniform and the capacity increases. As understood from the height per transfer unit on the serrate fin and on the Raschig ring, shown in table 2, the gas-liquid contact apparatus of this invention has an excellent efficiency. As the highest vapor velocity which permits the operation on the serrate fin with a pitch of 1.7 mm. is fairly large in comparison with that on Raschig ring, the scale of the gas-liquid contact apparatus of this invention may be considerably minimized with increase of the treating capacity. As to the pressure drop, the serrate fin with a pitch of 1.7 mm. and Raschig ring give nearly equal values in the same column velocity.

What is claimed is:

1. In a rectification column having a gas inlet adjacent its lower end, a gas outlet adjacent its upper end, a liquid inlet adjacent said upper end and a liquid outlet adjacent said lower end, a lower gas-liquid contact part adjacent said gas inlet and said liquid outlet, an upper gas-liquid contact part adjacent said liquid inlet and said gas-outlet, said gas inlet and said liquid outlet in communication with said lower part, said liquid inlet and said gas outlet in communication with said upper part, the improvement which comprises a gas-liquid redistributor between said upper and said lower parts and in communication therewith, said redistributor comprising a plurality of fins having hollow bores, said bores extending vertically and being open at both ends, whereby gas passways are formed in said bores and between adjacent fins, a liquid distribution conduit extending horizontally substantially alongside said fins, at least one opening extending over a substantial portion of the length of said conduit, whereby separation of downflow liquid from upflow gas and high efficiency contact between gas and liquid is obtained.

2. A column according to claim 1 wherein said opening is a slit extending substantially the length of said conduit.

3. A column according to claim 2 wherein said opening is a plurality of holes, said plurality extending over a substantial portion of the length of said conduit.

4. A column according to claim 1 wherein said redistributor is provided with a plurality of closed fins, said fins being located above said conduit and said hollow fins and adjacent thereto, spaces between said closed fins extending vertically and constituting at least one gas distribution passway.

5. A column according to claim 3 wherein each of said holes is provided with a tongue depending from its bottom.

6. A column according to claim 5 wherein said tongue is directed inwardly of said column.

7. A column according to claim 1 wherein the area of said gas distribution passway is less than the horizontal cross-sectional area of said contact part, whereby the linear velocity of the gas and liquid increases.

8. A column according to claim wherein a liquid distributor is provided between said liquid inlet and said upper contact part, said distributor communicating with said liquid inlet and said upper part.

9. A column according to claim 8 wherein said liquid distributor is the same as said redistributor.

10. A rectification column having a gas inlet adjacent its lower end, a gas outlet adjacent its upper end, a liquid inlet adjacent said upper end and a liquid outlet adjacent said lower end, a lower gas-liquid contact part adjacent said gas inlet and said liquid outlet, an upper gas-liquid contact part adjacent said liquid inlet and said gas outlet, said gas inlet and said liquid outlet in communication with said lower part, said liquid inlet and said gas outlet in communication with said upper part, a gas-liquid redistributor between said upper and said lower parts in communication therewith, said redistributor comprising a plurality of fins having hollow bores, said bores extending vertically and being open at both ends, whereby gas passways are formed in said bores and between adjacent fins, a liquid distribution conduit extending horizontally substantially alongside said fins, at least one opening extending over a substantial portion of the length of said conduit, whereby separation of downflow liquid from upflow gas and high efficiency contact between gas and liquid is obtained.

11. In a gas-liquid contact apparatus comprising a gas-liquid contact part accommodating metal fin material, a liquid distributor provided above the gas-liquid contact part, a gas distributor provided below the gas-liquid contact part, a liquid inlet provided in connection with the liquid distributor, a liquid outlet provided at the lowest position of the apparatus, a gas inlet provided in connection with the gas distributor, and a gas outlet provided with the highest position of the apparatus, the improvement comprising metal fin material, said fin material having (1) corrugated fins brazed either to each other or to intervening spacer plates and (2) at least one gas-liquid redistributor comprising corrugated fins forming gas passage means and brazed onto the side of a liquid redistribution trough having a perforated bottom and being provided at a position lower than the liquid distributor and higher than the gas distributor.

12. The improvement according to claim 11, wherein the redistributor further comprises an inlet for feeding fluid.